(12) United States Patent
Wenger et al.

(10) Patent No.: US 7,729,460 B2
(45) Date of Patent: Jun. 1, 2010

(54) METHOD AND DEVICE FOR PROVIDING TIMING INFORMATION IN A WIRELESS COMMUNICATION SYSTEM

(75) Inventors: Fabian Wenger, Göteborg (SE); Uwe Dettmar, Bornheim (DE); Udo Wachsmann, Schwabach (DE); Peter Schramm, Eching (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 21 days.

(21) Appl. No.: 11/955,263

(22) Filed: Dec. 12, 2007

(65) Prior Publication Data

US 2009/0052598 A1    Feb. 26, 2009

Related U.S. Application Data

(60) Division of application No. 10/751,117, filed on Jan. 5, 2004, now Pat. No. 7,327,817, which is a continuation of application No. PCT/EP02/05614, filed on May 22, 2002.

(30) Foreign Application Priority Data

Jul. 4, 2001   (EP)   ................... 01115679

(51) Int. Cl.
*H04L 7/00*   (2006.01)
(52) U.S. Cl. ........... 375/354; 375/150; 375/340; 375/343; 375/355; 455/502; 327/141
(58) Field of Classification Search ........ 375/150, 375/340, 343, 354
See application file for complete search history.

(56) References Cited

U.S. PATENT DOCUMENTS

| | | | | |
|---|---|---|---|---|
| 4,583,048 A | | 4/1986 | Gumacos et al. | |
| 5,117,441 A | * | 5/1992 | Weigand | 375/336 |
| 5,251,233 A | * | 10/1993 | Labedz et al. | 375/230 |
| 5,373,507 A | * | 12/1994 | Skold | 370/350 |
| 5,533,067 A | * | 7/1996 | Jamal et al. | 375/341 |
| 5,778,022 A | * | 7/1998 | Walley | 375/152 |

(Continued)

FOREIGN PATENT DOCUMENTS

GB   EP 0 800 285   1/1997

(Continued)

OTHER PUBLICATIONS

Related U.S. Appl. No. 11/751,117, filed Dec. 5, 2003; Inventor: Wenger et al.

(Continued)

*Primary Examiner*—David C Payne
*Assistant Examiner*—Leon Flores
(74) *Attorney, Agent, or Firm*—Nixon & Vanderhye P.C.

(57) ABSTRACT

A method and a device of providing timing information within a wireless communication system is described. The timing information is extracted from a received transmit signal. The inventive method comprises the steps of providing a training signal on the receiver side relating to a known signal portion of the transmit signal, scaling the training signal, quantizing the scaled training signal, correlating one or more parts of the received transmit signal with the scaled training signal to obtain one or more correlation results, and determining the timing information on the basis of the correlation results.

14 Claims, 2 Drawing Sheets

| half symbol | full symbol | full symbol |
|---|---|---|
| C32 | C64 | C64 |
| cyclic prefix | | |

U.S. PATENT DOCUMENTS

| | | | |
|---|---|---|---|
| 6,023,493 | A | 2/2000 | Olafsson |
| 6,144,709 | A * | 11/2000 | Piirainen et al. ............ 375/343 |
| 6,353,630 | B1 | 3/2002 | Schreib |
| 7,039,139 | B1 * | 5/2006 | Griffin ........................ 375/355 |

FOREIGN PATENT DOCUMENTS

| WO | 97/24819 A | 7/1997 |
|---|---|---|

OTHER PUBLICATIONS

Related U.S. Appl. No. 11/955,238 filed Dec. 12, 2007; Inventor: Wenger et al.

European Search Report issued in European Application No. 05012901.4 dated Jan. 16, 2006.

De Fina, *Simultaneous Frame and Bit Synchronization of HF Receivers by Constant False Alarm Methods*, Telecommunications Systems, vol. 7, No. 1, Milano, IT, Jan.-Feb. 1996, pp. 83-91.

Shimamura et al., *An AR Prefiltering Approach to Adaptive Equalization*, Proceedings of the International Symposium on Circuits and Systems (ISCS), US, New York, IEEE, Bd. May 3, 1993, pp. 730-733, XP000410102.

D'Aria et al, Synchronization Techniques and Viterbi Equalizers for TDMA Mobile Radio, Technical Reports-CSELT, Turin, IT, vol. 17, No. 2, Apr. 1, 1989, pp. 125-131, XP000575030.

Tan et al., Lo Complexity Spread Spectrum Correlator, Electronics Letters, IEEE Stevenage, GB, vol. 33, No. 14, Jul. 3, 1997, pp. 1204-1205, XP000734161.

Charlie Cahn et al., Performance in Gaussian Noise of Proposed PN sync Preamble for IEEE 802.16 Broadband Wireless Access Working Group, Online, Jul. 6, 2001, pp. 1-10.

R. Van Nee et al., OFDM Wireless Multimedia Communications, 2000, Artech House, Boston, XP002190874.

Speth et al., Frames Synchronization of OFDM Systems in Frequency Selective Fading Channels, VTC, 1997, Phoenix (mentioned in the appln. text of basic EP patent appln. 01 115 679.1, the PCT appln. text.

Muiler-Weinfurtner, On the Optimality of Metrics for Course Frame Synchronization in OFDM: A Comparison, PIMRC, 1998, Boston (mentioned in the appln. text of basic EP patent appln. 01 115 679.1, the PCT appln. text).

* cited by examiner

METHOD AND DEVICE FOR PROVIDING TIMING INFORMATION IN A WIRELESS COMMUNICATION SYSTEM

RELATED APPLICATIONS

This application is a divisional of U.S. application Ser. No. 10/751,117, filed on Jan. 5, 2004, now U.S. Pat. No. 7,327, 817, which is a continuation of PCT International Application No. PCT/EP02/05614, filed in English on 22 May 2002, which designated the US. PCT/EP02/05614 claims priority to EP Application No. 0115679.1, filed 4 Jul. 2001. The entire contents of these applications are incorporated herein by reference.

TECHNICAL FIELD

The invention relates to a method and a device of providing timing information in a wireless communication system and more particularly to efficient timing synchronization on the basis of a transmit signal having a signal portion known on the receiving side.

BACKGROUND

The provision of timing information is an essential feature of wireless communication systems which allows to ensure synchronicity among the distributed system components. In almost every wireless communication system the timing information is obtained from a transmit signal analyzed on a receiving side.

In the following, an approach for extracting timing information from an input signal is exemplarily described for wireless communication systems operating in accordance with Orthogonal Frequency Division Multiplexing (OFDM).

OFDM is a multicarrier modulation scheme which is especially suited for highly frequency-selective transmission channels such as typical channels for mobile communication systems or for high-rate wired transmission via copper lines. Highly frequency-selective channels are characterized by impulse responses which are substantially longer than one sample interval. Therefore, each received sample in a digital base band domain is a superposition of several transmit samples weighted by the respective channel coefficients. This means that highly frequency-selective channels are subject to intersample interference.

The principle of OFDM to combat intersymbol interference is to divide the total channel bandwidth into substantially smaller portions, i.e. subchannels. A sequence of samples to be transmitted is combined to a single OFDM symbol and transmitted in parallel on these subchannels. A single OFDM symbol thus uses all of the subchannels in parallel. In accordance with OFDM, transmitted subchannel signals are orthogonal to each other. Since the duration of one OFDM symbol is much longer than the sample interval, intersymbol interference is strongly reduced.

To further reduce intersymbol interference, usually a guard interval is introduced between two OFDM symbols which are to be consecutively transmitted. If the length of the guard interval exceeds the length of the channel impulse response, there is no residual intersymbol interference. Furthermore, if the guard interval is constituted by a repeated signal portion, e.g. a cyclic prefix, a very simple equalization of the frequency-selective channels in the frequency domain is possible.

However, since the use of a guard interval leads to additional transmission overhead, the length of the guard interval is usually chosen such that the intersymbol interference is not totally cancelled. Rather, only the main contributions of typical channels are accommodated in the guard interval and residual intersymbol interference is tolerated.

An OFDM receiver has to perform synchronization prior to demodulation of the subcarriers. The task during synchronization is to find an optimal timing for minimizing the effects of intersymbol interference. Therefore, timing information allowing to find out the optimal timing instant for synchronization purposes has to be provided.

Several synchronization approaches are known in the art. Most of these approaches are based on the exploitation of repeated signal portions within a transmit signal. Usually, the repeated signal portions are located at predefined locations of a so-called repetition preamble. An example for synchronization of OFDM systems based on a repetition preamble is described in M. Speth, F. Classen and H. Meyr, Frame Synchronization of OFDM Systems in Frequency Selective Fading Channels, VTC '97, Phoenix.

In an OFDM receiver the received sample stream is processed in order to recognize the repeated signal portion. Several metrics to detect repetition preambles for synchronization purposes are exemplarily described in S. Müller-Weinfurtner, On the Optimality of Metrics for Coarse Frame Synchronization in OFDM: A Comparison, PIMRC '98, Boston. These metrics make use only of the cyclic nature of the repeated signal portion but not of the actual content thereof.

A synchronization method which actually exploits the content of a repeated signal structure is known from R. van Nee, R. Prasad, OFDM for wireless multimedia communications, Artech House, 2000. According to this synchronization method, a matched-filter approach is pursued to achieve optimal timing synchronization for OFDM in a multipath environment. During matched filtering a special OFDM training signal derived from a transmit signal portion is used for which the data content is known to the receiver. In the matched filter, a received transmit signal is correlated with the known OFDM training signal. The resulting matched filter output signal comprises correlation peaks from which both timing information and frequency offset information can be derived.

The filter tap values used during matched filtering are obtained from training values comprised within the known OFDM training signal. According to a first approach, the filter tap values equal the transmitted training values. According to a second approach, the filter tap values are derived from the training values by means of quantization. Quantization reduces the overall complexity of the matched filter since the multiplications necessary during the correlation operations can thus be reduced to additions.

By means of quantization, each of the real part and the imaginary part of the training values is mapped separately on the nearest integer from the set of $\{-1, 0, 1\}$. The quantization is thus performed individually for the real and imaginary parts. This means that after quantization the filter tap values will usually also comprise a real and an imaginary part each. This leads to four additions per correlation operation. The number of zeros in the resulting set of quantized values is fixed depending on the individual training values comprised within the training signal.

There is a need for a method and a device for providing timing information for a received transmit signal which allow to derive the timing information in an efficient and flexible manner.

SUMMARY

The need is met using a method of providing time information for a received transmit signal. The method comprises: providing on a receiving side a training signal relating to a known signal portion of the transmit signal, scaling the training signal, quantizing the scaled training signal, correlating one or more parts of the received transmit signal with the scaled training signal to obtain one or more correlation results, and determining the timing information on the basis of the correlation results. Preferably, the provided timing information is an optimum timing instant for synchronization purposes. The timing instant can be optimum e.g. with respect to minimizing the interference power.

The signal portion of the transmit signal based on which the training signal is derived can be repeated in the transmit signal, i.e. the transmit signal may comprise a cyclic structure. Such a repeated signal portion in the transmit signal will increase the performance of the correlation. Preferably, the training signal is deduced from a repetition preamble of the transmit signal.

The scaling of the training signal has the advantage that it allows to control the outcome of the quantization and to influence the complexity of the subsequent correlation. Since the correlation capacity which is needed to be implemented depends on the number of quantized training values the real and imaginary parts of which are mapped on specific values like zero, the complexity of the correlation becomes adjustable. For example, a high number of zeros implies a low correlation complexity. Thus, scaling enables a flexible tradeoff between high performance correlation (few zeros) and low complexity correlation (many zeros).

The scaling factor can be either fixed or variable. The smaller the scaling factor, the more zeros will be contained within the quantized training signal and vice versa.

According to a preferred embodiment, which can be implemented additionally to or independently from the scaling operation, the real part and the imaginary part of each training value comprised within the training signal are not quantized individually, but jointly. For example, each training value may be mapped during quantization on a predefined set of pure real and pure imaginary values. This allows to reduce the correlation operations to only two real additions per multiplication.

Preferably, the set of $\{0, \pm 1, \pm j\}$ is used for the quantization. As mentioned previously, such a predefined set of pure real and pure imaginary values comprising the value zero is advantageous when correlation complexity is to be adjusted by appropriately selecting the scaling factor.

The individual correlation operations can be convolutions performed by means of a matched filter. The filter complexity corresponds to the previously discussed correlation complexity and the filter tap values equal the quantized training values. Of course, other correlation techniques apart from matched filtering can be applied as well.

The correlation results obtained by means of the correlation operations have preferably the form of estimated channel impulse responses. Due to the quantization step, the channel impulse responses obtained by correlation can be regarded as approximated channel impulse responses.

Based on the estimated channel impulse responses the optimal timing instant for synchronization purposes can be estimated. Preferably, the estimation of the optimal timing instant comprises determining a signal power of the channel impulse response for each possible timing instant. As an example, the signal power contained in individual time windows moving within the receive signal can be analyzed to determine the time window containing the maximum signal power.

According to a further embodiment of the invention, which is independent from the scaling approach outlined above, a false alarm detection is implemented. The false alarm detection can be configured to be a by-product of the determination of the timing information. Preferably, the false alarm detection is performed based on the maximum signal power which is an intermediate result obtained during timing synchronization.

By means of false alarm detection it can be checked whether the timing information already determined or the timing information still to be determined is or will be wrong. Performing false alarm detection based on an intermediate result allows to implement a false alarm detection scheme at almost zero additional computational or hardware complexity. Moreover, exploiting an intermediate result is advantageous from a power consumption point of view because it allows an early detection of a false alarm.

The false alarm detection scheme may comprise comparing the maximum signal power with a signal power threshold. The threshold may be determined based on the power of the training signal and is preferably selected such that the rate of discarding correct timing information is driven towards zero while having a sufficiently high detection probability for false alarms.

The technology may be implemented as a computer program product with program code portions for performing the method or as hardware solution. In case of a computer program product implementation the computer program product is preferable stored on a computer-readable recording medium.

A hardware solution may be realized in the form of a receiver having dedicated units, each unit performing one or more of the individual steps of the inventive method.

DETAILED DESCRIPTION

The following, the invention is exemplarily described with reference to a wireless communication system in the form of a HIgh PErformance Radio Local Area Network type 2 (Hiperlan/2). The physical layer of Hiperlan/2 is based on OFDM with a guard interval in the form a cyclic prefix. It may be well understood, however, that the invention also applies to other OFDM transmission systems with dedicated signal portions exploitable for timing purposes as well as to non-OFDM transmission systems having equivalent features. Above all, the invention is applicable to other Wireless Local Area Network (WLAN) systems such as standardized by IEEE (U.S.A.) or MMAC (Japan).

Hiperlan/2 is a short-range high-rate data communication system which may be used as a WEAN system, e.g. to transport internet protocol (IP) packets. However, Hiperlan/2 is also capable to act as wireless Asynchronous Transfer Mode (ATM) system as well as a public access system, e.g. with an interface to the Universal Mobile Telecommunication System (UMTS).

Hiperlan/2 is a packet-switched cellular system. In Hiperlan/2 five different kind of physical bursts (transport channels) are defined and each physical burst is preceded by a preamble portion containing OFDM training information for the purposes of acquisition, synchronization, channel estimation, etc.

Figure 1:
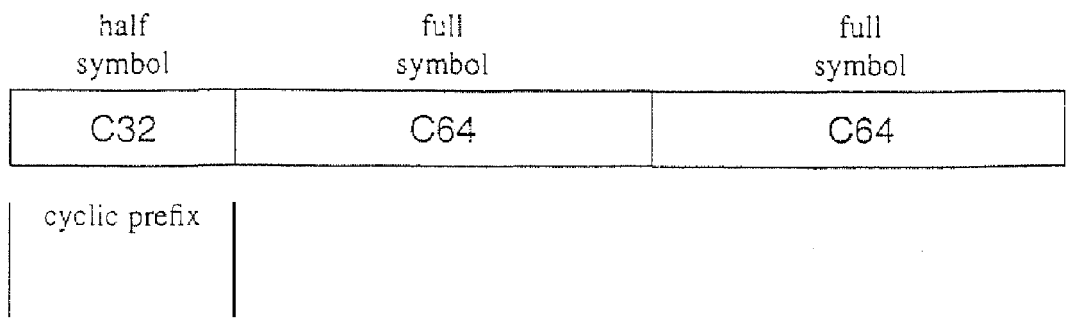
FIG. 1 is a schematic diagram of a portion of a repetition preamble.

In Hiperlan/2 preamble portions for different physical bursts are different. However, within each preamble portion there is a dedicated preamble part, constituted by the three OFDM symbols C32, C64 and again C64, appearing in each preamble type. This dedicated preamble part is depicted in FIG. 1. The long symbols C64 each comprise 64 samples ($N_{C64}$=64) and are identical. The short symbol C32 is a copy of the 32 last samples ($N_{C32}$=32) of the C64 symbols and can thus be viewed as a cycled prefix. Each physical burst comprises a payload portion in addition to the preamble portion and each data-carrying OFDM symbol within the payload portion comprises a separate cyclic prefix CP with 16 samples ($N_{CP}$=16). Therefore, the symbol C32 comprised within the preamble portion can be viewed as an extended cyclic prefix with respect to the CP symbol.

In the following, an embodiment of the method according to the Invention of providing timing information for a received transmit signal will be discussed in more detail for the Hiperlan/2 system outlined above.

Figure 2:
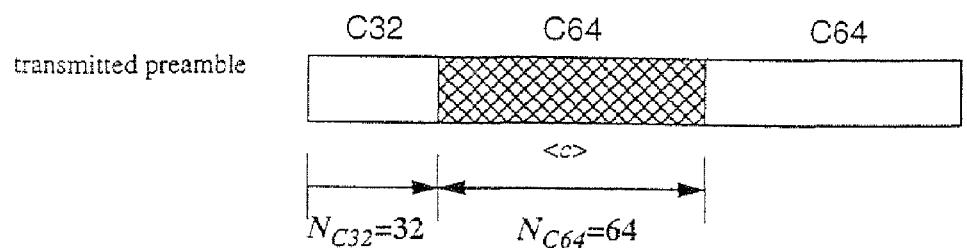
FIG. 2 is a schematic diagram of a transmitted repetition preamble.
Figure 3:
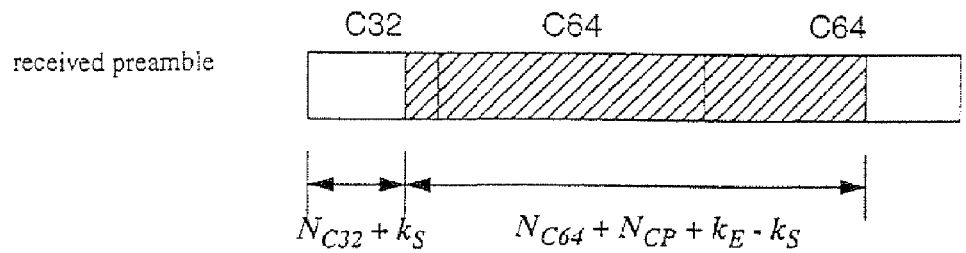
FIG. 3 is a schematic diagram of a received repetition preamble having a signal portion to be correlated with a training signal.

The location of the preamble samples which are involved in fine timing synchronization are exemplarily depicted in FIGS. 2 and 3. FIG. 2 shows a part of a preamble of a transmit signal. As already described with reference to FIG. 1, the preamble comprises one C32 symbol followed by two C64 symbol. The preamble part depicted in FIG. 2 comprises a repeated signal portion <c> which corresponds to the first C64 symbol. Based on the standardized content of the repeated signal portion <c>, i.e. the C64 symbol, the training signal is derived by using the complex-value samples c[.] comprised within <c> as training samples.

FIG. 3 shows the preamble part of a receive signal which corresponds to the preamble part of the transmit signal depicted in FIG. 2. The hatched portion of the received preamble indicates the location of the one or more parts of the receive signal to be correlated with the training signal. The values $k_S$ (which has a negative value) and $k_E$ describe the location of a search window. This location depends on the initial timing accuracy as well as on the various possible shapes of different channel impulse responses. Portions of the received preamble different from the hatched portions may of course also be taken for correlation purposes.

Now, an embodiment of a receiver according to the invention is described with reference to FIG. 4.

Figure 4:
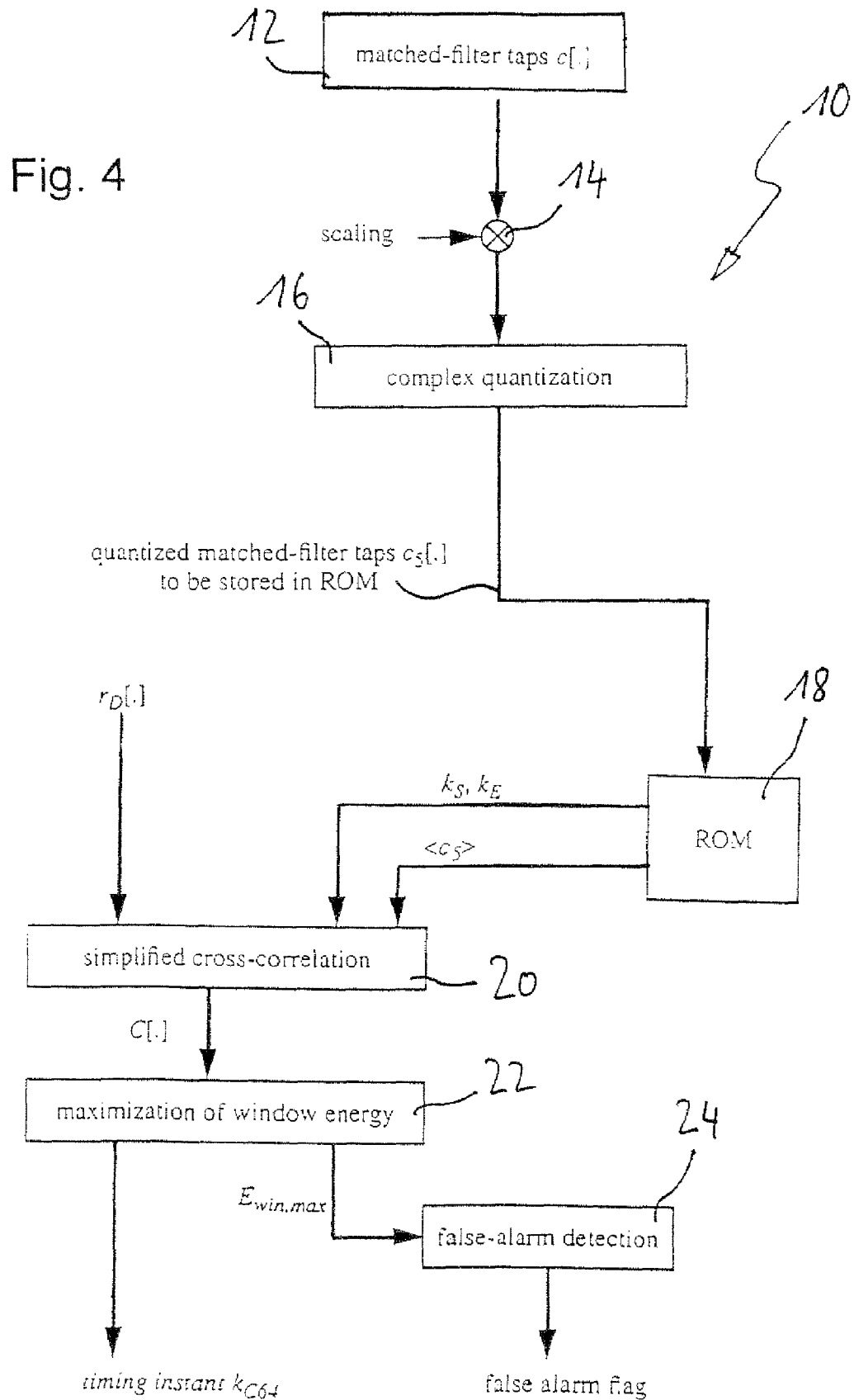
FIG. 4 is a schematic diagram of a receiver according to the invention.

The receiver 10 of FIG. 4 comprises a unit 12 for providing a training signal relating to a known content of the repeated signal portion <c> of the transmit signal, a unit 14 for scaling the training signal, a unit 16 for quantizing the scaled training signal, and a database In the form of a Read Only Memory (ROM) 18 for storing the quantized training signal. The receiver 10 further comprises a unit 20 for correlating one or more parts of the received signal with the scaled training signal to obtain one or more correlation results, a unit 22 for determining timing information on the basis of the correlation results and a unit 24 for detecting a false alarm.

The receiver 10 operates as follows. Firstly, the repeated signal portion <c> corresponding to the training signal is preprocessed to enable an efficient matched filtering and the pre-processed data is stored in the ROM 18. Secondly, a matched filtering is performed in the correlation unit 20 using the preprocessed data and an optimal timing instant $k_{C64}$ is determined in the determination unit 22. Simultaneously, false alarm detection is performed in the detection unit 24.

The repeated signal portion <c>, i.e. the training signal, comprises a sequence of complex-valued samples c[.] constituting training values. Since the correlation unit 20 is essentially a matched filter, the training values can also be referred to as (unprocessed) matched filter tap values.

Initially, the matched filter tap values c[.] are provided by the unit 12 which can be a memory or some kind of interface. The matched filter tap values c[.] are first subjected to scaling within the scaling unit 14. During scaling, the matched filter tap values c[.] are taken individually and scaled by a predefined or dynamically selected scaling factor.

The scaling factor is chosen to control the number of zero elements produced in the subsequent quantization operations which take place within the quantization unit 16. For example, a low scaling factor leads to a high number of zeros. Thus, the correlation or filter complexity can be adjusted.

After scaling, the scaled matched filter tap values c[.] are Individually subjected to quantization within the quantization unit 16. The quantization unit takes each scaled complex tap value c[.] and maps it on a quantization value chosen from the predefined set of $\{0, \pm 1, \pm j\}$. This set comprises only pure real and pure imaginary values. By mapping each scaled tap value c[.] on the set of $\{0, \pm 1, \pm j\}$, the sequence <c> of scaled tap values c[.] is transformed into the pentenary sequence <$c_5$> of quantized tap values $c_5$[.]. By this, the complex multiplications usually needed during matched filtering in the correlation unit 20 are either replaced by simple sign operations or by exchanges of real and imaginary parts or they are completely discarded in the case of scaled tap values c[.] mapped on the value $c_5[K]=0$.

The quantization can be performed by means of mapping a scaled tap value c[.] on this element of the set $\{0, \pm 1, \pm j\}$ which has the smallest euclidean distance or squared error with respect to the scaled tap value c[.].

After the quantization, the quantized tap or training values $c_5$[.] are stored in the ROM 18. The preprocessing described so far may be conducted prior to the actual timing procedure since the content of the C64 symbol is standardized and known a priori on the receiver side.

The first step in the actual timing procedure is to conduct the matched filtering within the correlation unit 20. For this purpose, the quantized pentenary training signal <$c_5$> as well as the parameters $k_S$, $k_E$ are read from the ROM 18 into the correlating unit 20. In the correlation unit 20, matched filtering is performed in accordance with $$C[k] = \sum_{\mu=0}^{N_{C64}-1} c_S*[\mu] \cdot r_D[\mu + k],$$

$$k = k_S, \ldots, (k_E + N_{CP})$$

where C[k] designates the estimated channel impulse response, $c_5$* designates the complex conjugated quantized tap value comprised within the pentenary training signal <$c_5$>, $r_D$ designates a sample value comprised within the receive signal and k designates a specific moment in time.

The estimated channel impulse response C[k] constitutes the correlation result or matched filter output of a single correlation operation. Altogether, a number of $(k_E+N_{CP})-k_S$ correlation or filtering operations are performed. During each correlation operation, a part of the receive signal comprising the receive signal samples $r_d[k], r_D[k+1], \ldots r_D[k+N_{C64}-1]$ is correlated with the processed training signal <$c_5$> corresponding to the sequence of tap values $c_5[0], c_5[1], \ldots c_5[N_{C64}-1]$.

Having obtained the channel impulse responses C[k] in a complexity-efficient manner as described above, the remaining part is to derive the best possible timing instant from the channel impulse responses C[k]. As is shown in R. van Nee, R. Prasad, OFDM for wireless multimedia communications, Artech House, 2000, the solution to the timing problem is to find the location of a window of length $N_{cp}+1$ within the hatched portion depicted in FIG. 3 such that the energy of the channel impulse response C[k] contained within this window is maximized. This process is performed within the detection unit 22.

In the detection unit 22, the energy $E_{win}[k]$ contained within each specific window of length $N_{CP}+1$ is calculated in accordance with $$E_{win}[k] = \sum_{i=0}^{N_{CP}} |C[i+k]|^2.$$

The estimated timing instant $k_{C64}$ corresponding to the begin of the first C64 symbol depicted in FIG. 2 is given by $$k_{C64} = \arg\max_{k \in \{k_S, \ldots, k_E\}} \{E_{win}[k]\}.$$

The maximum window energy $E_{win,max}$ for the optimum timing instant $k_{C64}$ can be defined as $$E_{win,max} := E_{win}[k_{C64}].$$

The value of $E_{win,max}$ is output to the detection unit 24 where false alarm detection is performed. False alarm detection aims at detecting whether the currently processed part of the receive signal is really due to the transmitted preamble or whether the initial acquisition or timing information has failed. False alarm detection is based on the fact that the encountered energy after matched filtering or correlation is significantly higher in the "right alarm" case compared to the false alarm case.

For simplicity, in the following several assumptions are made:
- an ideal training signal $<c_{ideal}>$ of length $N_{C64}=64$ is used
- $<c_{ideal}>$ shall have ideal auto-correlation properties, i.e. one peak and zeros elsewhere
- $<c_{ideal}>$ is used in the transmitter as well as in the receiver
- the power density spectrum of the received sample stream $<r_D>$ is white
- no noise is imposed
- a one-tap channel is considered.

The right alarm case is considered first. For ideal synchronization and ideal Automatic Gain Control (AGC), the correlation elements provide the squared magnitudes of the elements of $<c_{ideal}>$, which are in the average equal to the mean power of the training signal $P_{c,ideal}$. Thus, the amplitude of the correlation peak is equal to the length of $<c_{ideal}>$, namely $N_{C64}=64$, times $P_{c,ideal}$. The energy window after correlation contains exactly the peak and zeros elsewhere. Hence, the window energy for right alarm is $$E_{win,right} = N_{C64}^2 P_{c,ideal}^2 = 4096 P_{c,ideal}^2.$$

In the false alarm case the received sample sequence $<r_D>$ is uncorrelated to the transmitted $<c_{ideal}>$. Every correlation result is of the form $$C = \sum_{\mu=0}^{N_{C64}-1} c_{ideal} * [\mu] \cdot r_D[\mu].$$

To determine the average window energy in the false alarm case the expected value of the squared magnitude of C is needed. It yields $$E\{|C|^2\} = N_{C64} E\{|c_{ideal}|^2\} E\{|r|^2\} = N_{C64} P_{c,ideal} P_r,$$

where the assumptions that $<c_{ideal}>$ and $<r_D>$ shall be white sequences were used. As can be seen from $$E_{win}[k] = \sum_{i=0}^{N_{CP}} |C[I+k]|^2,$$

each element in the energy window has the average power $E\{|C|^2\}$. Hence, the average window energy for false alarm is $$E_{win,false} = (N_{CP}+1) \cdot N_{C64} \cdot P_{c,ideal} \cdot P_r = 1088 \cdot P_{c,ideal} \cdot P_r.$$

Of course, this derivation holds only for the assumptions illustrated above and only provides the principles of a false alarm detection which is based on energy calculations. In real reception, impairments like noise, a non-ideal training signal, and multipath propagation have to be taken into account. The mean power of the training signal $<c_S>$ at the receiver may be different from that in the received sample stream dependent on the AGC setting. Thus, the relevant energy terms regarding false alarm detection have to be rewritten as $$E_{win,right} \leq N_{C64}^2 \cdot P_{c,S} \cdot P_r, \text{ and}$$

$$E_{win,false} \approx (N_{CP}+1) \cdot N_{C64} \cdot P_{c,S} \cdot P_r.$$

Based on these energy terms an energy threshold ($E_{threshold}$) for the window energy can be defined such that it becomes very unlikely that right alarms are discarded but that there will be still a sufficiently high false alarm detection rate.

It may be well understood that the timing and quantization principles described above are not restricted to maximizing the signal power within the guard interval. One could also think for some receiver algorithms of maximizing the energy in a window having a size different from the guard interval length. It is also possible to combine several different timing strategies to get different timing instants which might then be selected by other criteria dependent on the post processing algorithms.

The invention claimed is:

1. A method in a wireless communication system of providing timing information for a received transmit signal, the method implemented in a receiver comprising:
   correlating, by a signal correlator in the receiver, one or more parts of the received transmit signal with a quantized training signal to obtain one or more correlation results;
   determining, by a timing unit in the receiver, the timing information on the basis of the correlation results; and
   detecting, by a false alarm detector in the receiver, incorrect timing information corresponding to a false alarm on the basis of a signal energy contained within a time window of the received transmit signal, wherein:
   one or more of the correlation results are obtained in the form of estimated channel impulse responses,
   the signal energy is a channel impulse response signal energy contained in the respective time window of the received transmit signal and is determined for each possible timing instant, the step of determining the timing information on the basis of the correlation results comprises determining the time window containing a maximum signal energy, and the detection of incorrect timing information corresponding to a false alarm is based on comparing the maximum signal energy with a predefined signal energy threshold.

2. The method according to claim 1, further comprising:
scaling the training signal, and
controlling the computational complexity of the correlation step by dynamically selecting a scaling factor.

3. The method according to claim 1, wherein the training signal comprises complex training values and wherein a real part and an imaginary part of each training value are quantized jointly.

4. The method according to claim 3, wherein, during quantization, the training values are mapped on a predefined set of pure real and pure imaginary values.

5. The method according to claim 4, wherein the predefined set of pure real and pure imaginary values comprises a value zero.

6. The method according to claim 5, wherein a scaling factor is varied to adjust the number of training values mapped on the value zero.

7. The method according to claim 1, further comprising using the provided timing information as a synchronization timing instant.

8. The method according to claim 1, wherein the one or more parts of the receive signal are correlated with a scaled training signal using a matched filter.

9. The method in claim 1, wherein the predefined energy threshold is determined so that a false claim detection rate is maximized while minimizing cases where legitimate alarms are disregarded.

10. Receiver apparatus for a wireless communication system for receiving a transmit signal, comprising electronic circuitry configured to:

correlate one or more parts of the received transmit signal with a quantized training signal to obtain one or more correlation results;

determine timing information on the basis of the correlation results; and detect incorrect timing information corresponding to a false alarm on the basis of a signal energy contained within a time window of the received transmit signal, wherein the electronic circuitry is further configured to:
obtain one or more of the correlation results in the form of estimated channel impulse responses, determine the signal energy corresponding to a channel impulse response signal energy contained in the respective time window of the received transmit signal for each possible timing instant, determine the timing information on the basis of the correlation results comprises determining the time window containing a maximum signal energy, wherein the detection of incorrect timing information corresponding to a false alarm is based on comparing the maximum signal energy with a predefined signal energy threshold.

11. The receiver apparatus according to claim 10, wherein the training signal comprises complex training values, and wherein the electronic circuitry is configured to jointly quantize a real part and an imaginary part of each training value of the training signal.

12. The receiver apparatus according to claim 10, wherein the predefined energy threshold is determined so that a false claim detection rate is maximized while minimizing cases where legitimate alarms are disregarded.

13. A computer program product embodied in a tangible medium comprising program code portions for performing the steps of claim 1 when the computer program product is run on a computer system.

14. The computer program product according to claim 13 stored on a computer-readable recording medium.

* * * * *

UNITED STATES PATENT AND TRADEMARK OFFICE
CERTIFICATE OF CORRECTION

PATENT NO. : 7,729,460 B2
APPLICATION NO. : 11/955263
DATED : June 1, 2010
INVENTOR(S) : Wenger et al.

It is certified that error appears in the above-identified patent and that said Letters Patent is hereby corrected as shown below:

On Page 2, item (56), under "OTHER PUBLICATIONS", in Column 2, Line 4, delete "Lo" and insert -- Low --, therefor.

On Page 2, item (56), under "OTHER PUBLICATIONS", in Column 2, Line 16, delete "Muiler-Weinfurtner," and insert -- Muller-Weinfurtner, --, therefor.

In the drawings:

In Fig. 4, Sheet 2 of 2, below Tag "22", delete "$E_{win.max}$" and insert -- $E_{win,max}$ --, therefor.

In Fig. 4, Sheet 2 of 2, below Tag "24", delete "f.ag" and insert -- flag --, therefor.

In Column 4, Line 4, delete "embodiment of the invention," and insert -- non-limiting example embodiment, --, therefor.

In Column 4, Line 30, after "as", insert -- a --, therefor.

In Column 4, Line 30, after "In", insert -- the --, therefor.

In Column 4, Line 32, delete "preferable" and insert -- preferably --, therefor.

In Column 4, Line 52, delete "following, the invention" and insert -- following description --, therefor.

In Column 4, Line 57, delete "invention" and insert -- technology described --, therefor.

In Column 4, Line 61, delete "invention" and insert -- technology described --, therefor.

In Column 4, Line 65, delete "WEAN" and insert -- WLAN --, therefor.

Signed and Sealed this
Twenty-second Day of February, 2011

David J. Kappos
*Director of the United States Patent and Trademark Office*

CERTIFICATE OF CORRECTION (continued)

U.S. Pat. No. 7,729,460 B2

In Column 5, Lines 24-25, delete "an embodiment of the method according to the Invention of" and insert -- an example embodiment --, therefor.

In Column 5, Lines 50-51, delete "an embodiment of a receiver according to the invention" and insert -- an example embodiment of a receiver --, therefor.

In Column 6, Line 49, delete "$C_S^*[\mu] \cdot r_D[\mu+k]$," and insert -- $C_5^*[\mu] \cdot r_D[\mu+k]$, --, therefor.

In Column 6, Line 64, delete "$r_d[k]$," and insert -- $r_D[k]$, --, therefor.

In Column 7, Line 7, delete "$N_{cp}+1$" and insert -- $N_{CP}+1$ --, therefor.

In Column 7, Line 23, delete "$\arg\max_{k \in \{k_S, \ldots, k_E\}} \{E_{win}[k]\}.$" and insert -- $\arg\max_{k \in \{k_S, \ldots, k_E\}} \{E_{win}[k]\}.$ --, therefor.

In Column 8, Line 17, delete "$=N(N_{CP}+1) \cdot N_{C64} \cdot P_{c,ideal} \cdot P_r=$" and insert -- $=N(N_{CP}+1) \cdot N_{C64} \cdot P_{c,ideal} \cdot P_r=$ --, therefor.